Figure 1:
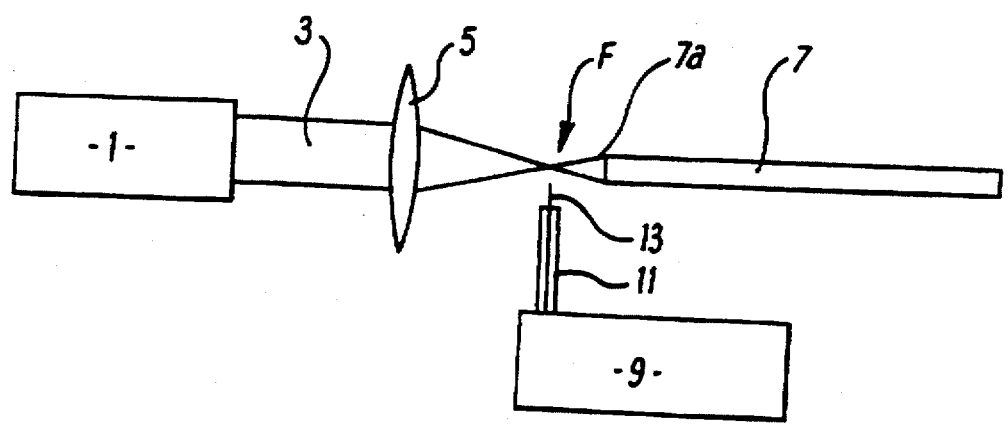

United States Patent [19]
Whitehouse et al.

[11] Patent Number: 5,737,462
[45] Date of Patent: Apr. 7, 1998

[54] RADIATION COUPLING ARRANGEMENTS WITH FREE ELECTRON REMOVAL

[75] Inventors: Andrew Ian Whitehouse, Cumbria; Aled Wyn Williams; Richard Marc Perks, both of Swansea, all of United Kingdom

[73] Assignee: British Nuclear Fuels plc, Warrington, England

[21] Appl. No.: 571,851

[22] PCT Filed: Apr. 20, 1995

[86] PCT No.: PCT/GB95/00889

§ 371 Date: Aug. 1, 1996

§ 102(e) Date: Aug. 1, 1996

[87] PCT Pub. No.: WO95/29417

PCT Pub. Date: Nov. 2, 1995

[30] Foreign Application Priority Data

Apr. 21, 1994 [GB] United Kingdom .................... 9407893

[51] Int. Cl.⁶ ...................................................... G02B 6/32

[52] U.S. Cl. .................................. 385/31; 385/33; 385/40; 250/281

[58] Field of Search .......................... 385/15, 31, 33–35, 385/38–40, 88; 372/25, 26, 29; 359/238, 240, 245, 251, 254; 250/281–283

[56] References Cited

U.S. PATENT DOCUMENTS 5,149,406  9/1992  Mullen et al. ...................... 250/282 X

FOREIGN PATENT DOCUMENTS 3838272     1/1990  Germany.
3838272 C1  1/1990  Germany.

*Primary Examiner*—John D. Lee
*Attorney, Agent, or Firm*—Sheridan Ross P.C.

[57] ABSTRACT

An optical apparatus including a laser producing in use an output laser beam and an optical guide for guiding radiation of the output laser beam when incident thereon and characterised by means for depleting of free charge carriers a region in a path to be traversed by the output laser beam between the laser and the guide.

20 Claims, 1 Drawing Sheet

RADIATION COUPLING ARRANGEMENTS WITH FREE ELECTRON REMOVAL

The present invention relates to radiation coupling arrangements. In particular, it relates to a method and an apparatus for coupling laser radiation into an optical guide.

There are many practical applications in which high power laser beams are required to be transmitted via optical guides. For example, lasers used in surgical applications are employed together with optical fibre cables.

There are a number of technical difficulties associated with the coupling of high power, pulsed laser radiation with optical fibre cables. One such difficulty arises when the laser beam is focused into the fibre. Since many fibres have core diameters less than 1 mm, very large peak power densities of laser radiation may be produced on the end face of the fibres. This can result in significant damage to the fibres and, therefore, a rapid deterioration in the optical transmission characteristics of the fibres.

To date, a number of techniques have been developed to facilitate the coupling into optical fibres of radiation outputs of high power pulsed lasers. One such technique involves the use of tapered fibres. This type of fibre is manufactured in such a way that one end has a considerably larger diameter than the other end (eg 1 cm and 1 mm respectively). When a laser beam is focused onto the larger diameter end, power densities on the face of the fibre are considerably reduced. However, these tapered fibres are very expensive and are not ideally suited to certain applications (eg laser surgery) as the fibres are expensive and the cost of replacing the fibres after each use is likely to be prohibitive.

In a typical laser-to-fibre guide coupling arrangement the output laser beam is normally focused by a lens onto the fibre(s). The focal point of the lens is set to be some distance in front of the fibre in order that a diverging beam enters the fibre. If the focal point of the lens is situated within the fibre, very high laser power densities will be produced at the focus within the fibre material resulting in a high probability of fibre damage.

In the known coupling arrangement described, a problem arises at very high laser powers in the following way. There is a limiting laser power density above which the air through which the laser beam travels becomes ionised and produces a plasma ("laser-induced plasma"). Typical power densities required to produce a plasma in air are of the order $10^{10}$ watts per $cm^2$. Power densities of this order a readily obtainable when the output beams of certain pulsed lasers such as Nd:YAG (Q-switched) are focused using conventional optical lenses. Once a plasma is produced, plasma shielding prevents further laser radiation from entering the fibre.

It is the purpose of the present invention to provide an arrangement for coupling the output of a laser, especially a high power pulsed laser beam, into an optical guide in which the problem of producing a laser-induced plasma is eliminated or at least reduced in effect.

According to the present invention in a first aspect there is provided an optical apparatus including a laser producing in use an output laser beam and an optical guide for guiding radiation of the output laser beam when incident thereon and characterised by means for depleting of free charge carriers a region in a path to be traversed by the output laser beam between the laser and the guide.

According to the present invention in a second aspect there is provided a method of coupling laser radiation from a laser to an optical guide using the apparatus of the first aspect which includes directing the output laser beam produced by the laser onto the guide whilst maintaining, in a region in the path traversed by the output laser beam, a depletion of free charge carriers.

The said means for depleting may comprise means for producing in the said region an electric field.

The said means for depleting may comprise an electrode to which an electrical potential may be applied from a high voltage source. The applied potential may exceed 1 kV, and desirably exceeds 5 kV. The applied potential may be negative (with respect to earth) to facilitate depletion of free electrons existing in the atmospheric gas in the said region by repulsion in a direction away from the electrode.

Charge carriers, specifically free electrons, will normally exist in the air through which the output laser beam has to pass. Electrons may be present due, for example, to cosmic ray interactions or dust particles. These electrons may be accelerated to high energies by a laser beam via a process known as inverse Bremsstrahlung. They may then interact with the gas atoms and molecules of the air and create an avalanche of electrons. The avalanche electrons are also accelerated by the laser radiation and eventually a plasma can be formed. This process takes place over a timescale of the order of nanoseconds. However, if the air in the path of the laser beam is depleted of free-electrons in accordance with the present invention, then the probability of plasma formation for a given laser power density is considerably reduced. This allows laser radiation to be coupled into the optical guide with reduced risk of cut-off.

The region between the laser and the guide is conveniently in an evacuable chamber in which the air pressure may be reduced in order to lower the number of potential sites at which free charge carriers may exist.

The electrode preferably provides a sharp point which facilitates the production of a localised high intensity electric field. The electrode conveniently comprises a portion providing a pin electrode.

The said point is desirably located close to the path traversed by the laser beam. The output laser beam may be focused by one or more lenses in order to reduce the cross-sectional area of the beam to better match that of the guide. The focal point of the lens or combination of lenses may be in front of the guide (ie between the lens and the guide). The said region depleted of free carriers may include the focal point. For example, the said electrode point may be located adjacent to the focal point preferably with the point of the electrode aimed substantially at the focal point.

The optical guide may comprise a known optical guide, eg one or more optical fibres, eg a bundle of fibres, eg made of a suitable high quality glass.

The laser may be any known laser which produces an output beam capable of producing a laser induced plasma in normal atmospheric conditions. The laser may for instance, be a solid state laser, a dye laser, or gas laser which may provide a continuous or pulsed output. The output may be in the visible electromagnetic region but it could be non-visible, eg infra-red radiation, depending upon the application to which the radiation is to be put.

Where the laser provides a pulsed output it may for instance be a Q-switched laser.

Where the laser is a solid state laser it may for example be a ruby laser or a garnet laser, eg Nd-YAG.

Where the laser is gas laser it may be a $CO_2$ laser, an He—Ne laser or an excimer laser.

The apparatus according to the present invention may be employed in a variety of known applications employing guided optical radiation, eg surgical inspection, surface decontamination and encapsulation techniques (as in Applicants' PCT WO 93/13531), surface stripping as in Applicants' GB 9322845, surface profile measurement as in Applicants' GB 9323054.8, remote temperature sensing as Applicants' EP 93308966.6.

Embodiments of the present invention will now be described by way of example with reference to the accompanying drawings, in which:

FIG. 1 is a diagrammatic side view of a laser beam production, coupling and guiding arrangement embodying the present invention.

As shown in FIG. 1, a Nd-YAG Q-switched laser 1 provides an output pulsed laser beam 3 of average peak power $-10^{10}$ watts per cm$^2$. The beam 3 is directed toward a fibre-optic bundle guide 7 having an end 7a. The beam 3 is focused by a lens 5 to a focal point F in front of the end 7a of the guide 7, the cross-sectional area of the beam 3 incident on the end 7a being less than that of the beam emerging from the laser 1. A high voltage source 9 is connected to an electrode 11 having a projection comprising a pin 13. The end of the pin 13 remote from the source 9 is adjacent to the focal point F. The region extending from the laser to the guide 7 through the focus F is in a chamber (not shown) at reduced pressure.

In use, the source 9 provides a high negative voltage of about 6 kV. The electrode 11 and the pin 13 are thus maintained at a negative potential of about −6 kV.

The strong electric field produced in the region of the focal point F by the pin 13 causes acceleration of free electrons away from the focal point F thereby depleting that region of free electrons. When the laser 1 is energised, the probability of plasma formation in the region of the focal point F is thereby reduced and the beam 3 is allowed to reach the end 7a of the guide 7 without cut-off. The guide 7 is flexible and guides the laser radiation from the beam 3 to an object (not shown) to which it is applied in a known way eg for one of the purposes mentioned above.

We claim:

1. An optical apparatus including a laser producing an output laser beam, an optical guide means for guiding a focused laser beam, and focusing means, positioned between the laser and the optical guide means, for focusing the output laser beam to form the focused laser beam, the focused laser beam following a path from the focusing means to the optical guide means, the path having a path length and at least a portion of the path length comprising free electrons, comprising means, positioned between the focusing means and the optical guide means, for selectively depleting free electrons from a first portion of the path length wherein the first portion of the path length is less than the path length and wherein the means for selectively depleting is an electrode which provides a sharp point and a localized electric field.

2. An apparatus as in claim 1, wherein said means for selectively depleting comprises means for producing an electric field along the first portion.

3. An apparatus as in claim 2, wherein said means for producing an electric field comprises an electrode and a voltage source for applying an electrical potential to said electrode to produce an electric field having a strength that varies along the path length.

4. An apparatus as in claim 3, wherein said electrical potential applicable by said voltage source exceeds about 1 kV.

5. An optical apparatus as in claim 3, wherein said electrical potential is negative with respect to earth.

6. An optical apparatus as in claim 3, wherein the focused radiation has a focal point wherein said electrode provides a point, and wherein the electric field depletes free electrons from the focal point.

7. An optical apparatus as in claim 1, wherein the focusing means comprises at least one lens to focus the output beam of the laser.

8. An optical apparatus as in claim 1, wherein said optical guide means comprises at least one optical fibre.

9. An optical apparatus as in claim 1, wherein said laser produces one of a continuous or pulsed output.

10. An optical apparatus as in claim 1, wherein at least a portion of the path length is contained in a chamber at reduced atmospheric pressure.

11. A method for coupling an output laser beam with an optical guide, comprising:

focusing an output laser beam with a focusing lens to form a focused laser beam, the focused laser beam following a selected path between the focusing lens and an optical guide, the path having a path length and at least a portion of the path length passing through a region comprising free electrons;

applying a localized electric field along a first portion of the path length using an electrode such that the strength of the localized electric field varies along the path length; and selectively depleting the free electrons along the first portion wherein the first portion is less than the path length wherein the focused laser beam has a focal point along the path, the electrode has a point to form a localized electric field along the first portion of the path, and the electrode is positioned adjacent to the focal point.

12. The method as in claim 11, wherein the depleting step comprises forming an electric field along the first portion of the path length while a second portion of the path length is substantially free of an electric field.

13. The method as in claim 11, wherein the focusing lens has a focal point, the focused laser beam passes through the focal point, and the focal point is located at a distance from an end of the optical guide.

14. An optical apparatus, comprising:

a laser for producing an output laser beam;

an optical guide for guiding a focused laser beam incident on the optical guide;

a focusing lens, positioned between the laser and the optical guide such that the focusing lens contacts the output laser beam, for forming the focused laser beam, wherein the focused laser beam follows a path, having a path length, that extends from the focusing lens to the optical guide and wherein free electrons are present along at least a portion of the path length; and a sharp point electrode for applying a localized electric field along a first portion of the path to remove at least a portion of the free electrons along the first portion of the path, the first portion of the path having a length less than the path length.

15. An optical apparatus as in claim 14, wherein said laser is selected from the group consisting of a solid state laser, a dye laser and a gas laser.

16. An optical apparatus as in claim 14, wherein the focused laser beam has a focal point along the path and wherein the first portion of the path passes through the focal point.

17. An optical apparatus as in claim 14, wherein the first portion of the path is located at a distance from the focusing lens.

18. The optical apparatus as in claim 14, wherein the focused laser beam has a focal point along the path, the sharp point electrode has a point to form a localized electric field along the first portion of the path, and the sharp point electrode is positioned adjacent to the focal point.

19. An optical apparatus as in claim 14, wherein a voltage source applies an electrical potential to the sharp point electrode, said electrical potential being negative with respect to earth.

20. An optical apparatus including a laser producing an output laser beam, an optical guide means for guiding a focused laser beam, and focusing means, positioned between the laser and the optical guide means, for focusing the output laser beam to form the focused laser beam, the focused laser beam following a path from the focusing means to the optical guide means, the path having a path length and at least a portion of the path length comprising free electrons, comprising means, positioned between the focusing means and the optical guide means, for selectively depleting free electrons from a first portion of the path length wherein the first portion of the path length is less than the path length, wherein the means for selectively depleting comprises means for producing an electric field along the first portion, wherein the means for producing an electric field comprises an electrode and a high voltage source for applying an electrical potential to the electrode to produce an electric field having a strength that varies along the path length, and wherein the electrode provides a point, and wherein the electric field depletes free electrons from the focal point.

* * * * *